United States Patent

Goetz et al.

[11] Patent Number: 5,160,460
[45] Date of Patent: Nov. 3, 1992

[54] VENTILATION SYSTEM FOR A LIQUID-FILLED BASIN

[75] Inventors: Helmut Goetz, Regensdorf; Ludwig Scheibinger, Munich; Peter Steinbach, Kallstadt, all of Fed. Rep. of Germany

[73] Assignee: Metz Mannheim GmbH, Mannheim, Fed. Rep. of Germany

[21] Appl. No.: 548,908

[22] PCT Filed: Jun. 15, 1989

[86] PCT No.: PCT/DE89/00388
§ 371 Date: Jul. 31, 1990
§ 102(e) Date: Jul. 31, 1990

[87] PCT Pub. No.: WO90/08742
PCT Pub. Date: Aug. 9, 1990

[30] Foreign Application Priority Data

Jan. 31, 1989 [DE] Fed. Rep. of Germany ....... 3902763

[51] Int. Cl.$^5$ ............................ C10J 1/08; C02F 3/20; A01K 63/04
[52] U.S. Cl. ................................. 261/122.1; 261/124; 210/170; 210/221.1; 210/236; 138/106
[58] Field of Search ................ 261/122, 124; 210/170, 210/221.1, 236; 119/3, 4, 5; 138/106

[56] References Cited

U.S. PATENT DOCUMENTS

| 3,318,098 | 5/1967 | Hoddinott et al. | 261/124 |
| 3,880,965 | 4/1975 | Dudis et al. | 261/122 |
| 4,051,035 | 9/1977 | Boschen et al. | 261/124 |
| 4,923,614 | 5/1990 | Engelbart | 210/321.69 |
| 4,960,546 | 10/1990 | Tharp | 261/124 |

FOREIGN PATENT DOCUMENTS

| 0380738 | 8/1990 | European Pat. Off. |
| 3619757 | 12/1987 | Fed. Rep. of Germany |
| 3627665 | 2/1988 | Fed. Rep. of Germany |

Primary Examiner—Stanley S. Silverman
Assistant Examiner—Robert James Popovics
Attorney, Agent, or Firm—Collard & Roe

[57] ABSTRACT

One or more hoses (10) belong to the ventilation system which through a perforation are constructed at least partially as ventilation hose (60). Each of the hoses is permanently connected with a number of holding devices distributed over its length, which hold the hose (10) from below. The holding devices run in a guide rail (14). The hose (10) is drawn into the empty or liquid-filled basin (10) with a traction device along the guide rail (14) which introduces the tractive force onto the body of the hose and holds it there without prestress.

15 Claims, 5 Drawing Sheets

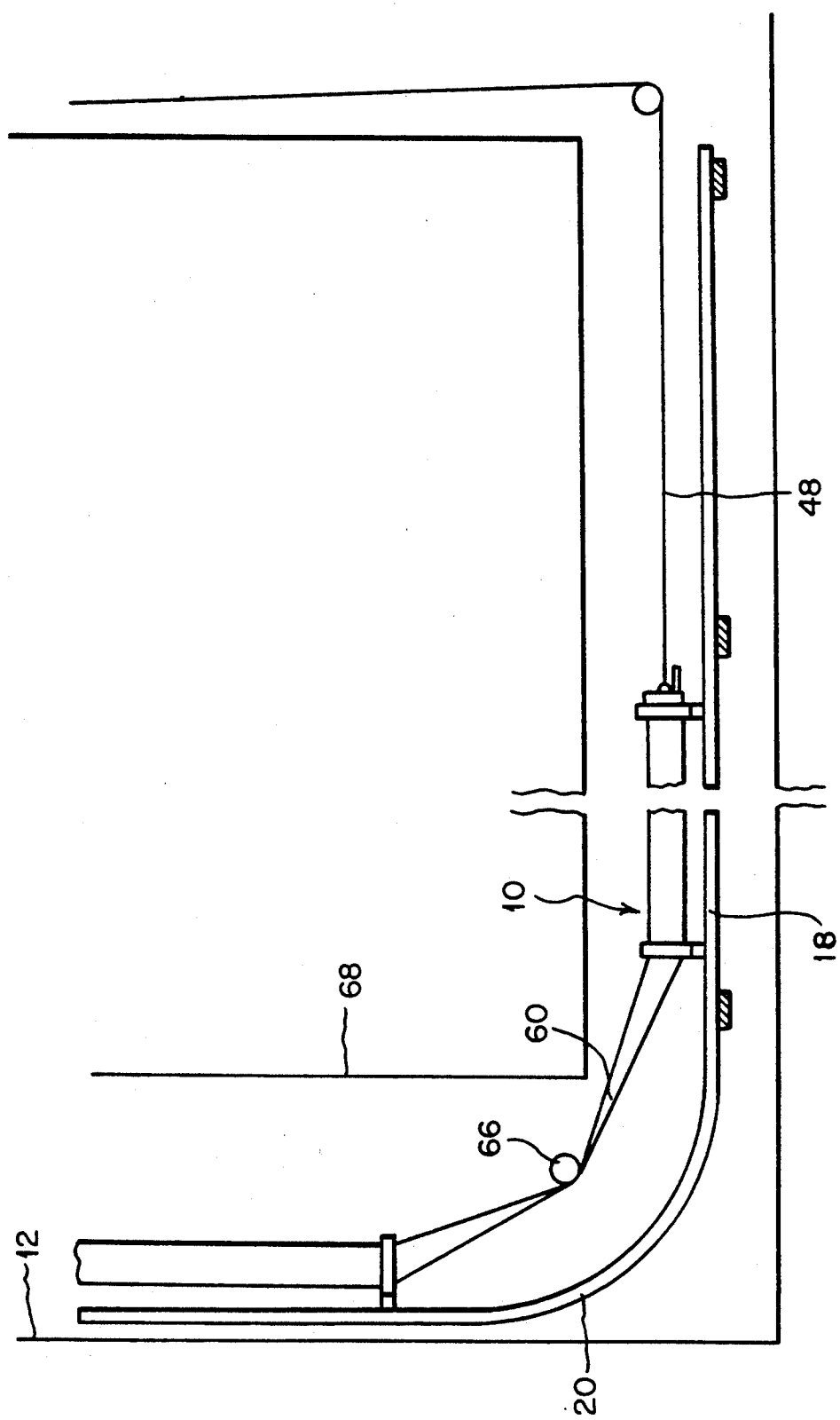

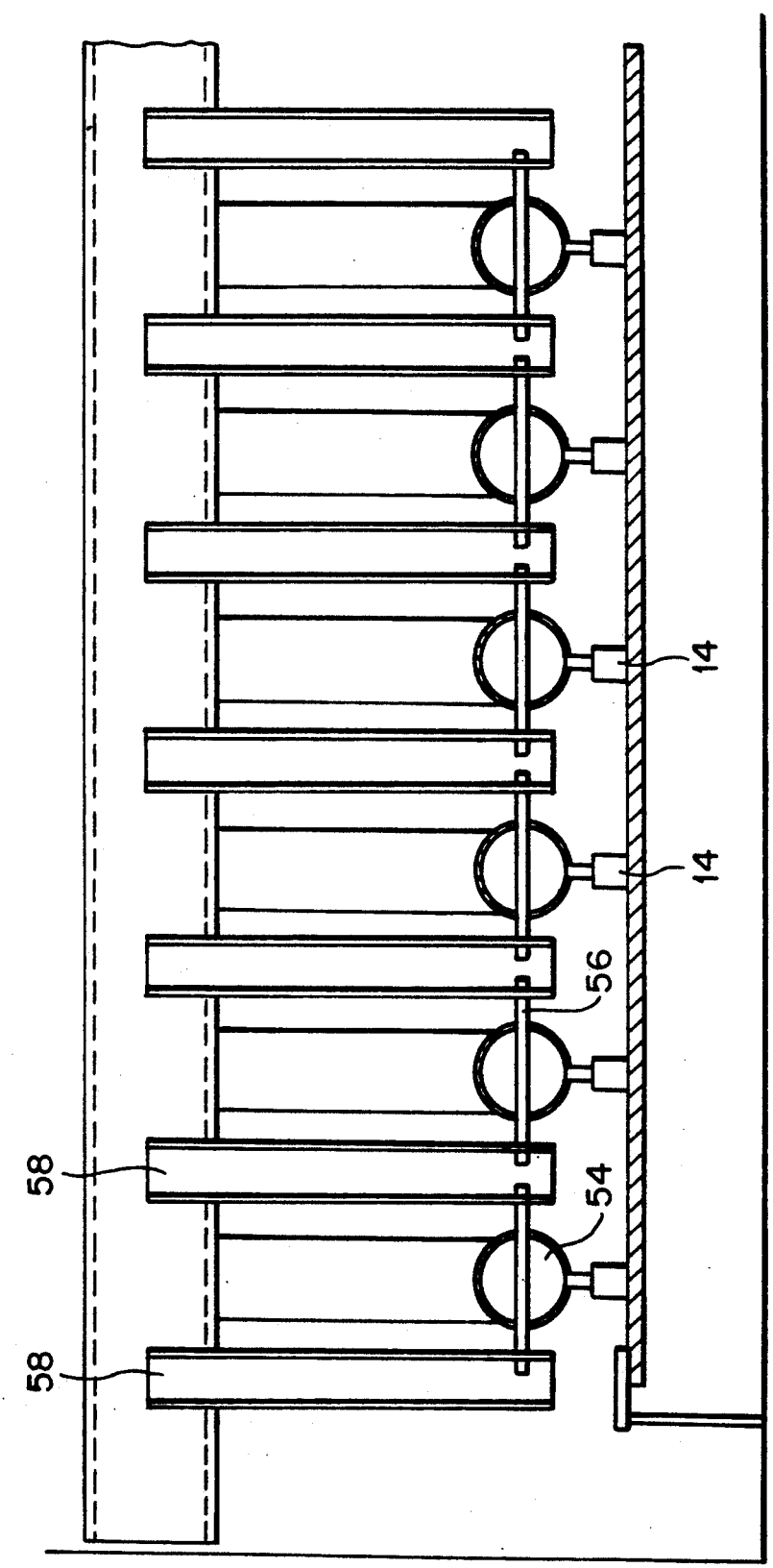

VENTILATION SYSTEM FOR A LIQUID-FILLED BASIN

BACKGROUND OF THE INVENTION

1. Field of the Invention

The invention relates to a ventilation system for a liquid-filled basin.

2. Description of the Prior Art

Diverse ventilators are well-known for liquid-filled basins, which have a ventilation device rather complicated in design. The connection of the ventilation device of necessity includes intensive installation and a bulky guide arrangement. A further disadvantage is that maintenance, repair, and replacement of components of the ventilation system are very complicated and labor-intensive.

In the DE-OS 36 27 655.0-23 an improved ventilation system is disclosed, in which a ventilation hose is laid in a permanently installed upwardly open U-profile guide anchored below the liquid surface and held fast by straps which extend over the hose. The hose is pulled in the U-profile guide under prestress.

Prestressing of the ventilation hose has not proved in practice to be effective. The concept described in DE-OS 36 27 665.0-23 to effect a freeing of the perforation of the ventilation hose from deposits, blockages, etc. through variation of the prestress and the resulting extension in length is not effective, since problematic deposits cannot be removed in this fashion. The high prestress of the hose, which entails considerable mechanical apparatus, leads in the long run to a plastic deformation of the hose, which necessarily requires that it repeatedly be shortened, until finally the material is exhausted after a relatively short useful life. The perforation holes are expanded by the prestress which leads to an undesirable increased intrusion of water in the ventilation hose when the prevailing air pressure drops off. The air bubbles also become larger through the expansion of the holes so that the utilization of oxygen is less efficient; the effect of ventilation is reduced.

SUMMARY OF THE INVENTION

The task of the invention is to create a simply constructed, easily maintained ventilation system, in which a ventilation hose is laid without prestress and resulting consequently in a reduced material wear, a longer useful life, a better utilization of oxygen and a reduced intrusion of water.

This task is fulfilled with a ventilation system for a liquid-filled basin, particularly a liquid purification plant or a fish fattening tank, which comprises at least one guide rail affixed to the basin, each guide rail having a descending intake section, a horizontal section adjacent the bottom of the basin and an arcuate section connecting the intake and horizontal sections of the guide rail, a hose associated with each guide rail, each hose having a circumferentially extending outer wall and an intake section associated with the descending intake section of the guide rail, a horizontal section associated with the horizontal guide rail section and a connecting section associated with the arcuate guide rail section. At least one of the hose sections is perforated for permitting air to escape from the hose into the liquid-filled basin. A plurality of hose holding devices are glidably guided along the guide rail and spaced therealong from each other for retaining the hose in position along the guide rail against buoyancy in an operating position of the hose in the liquid-filled basin, the holding devices being connected to a lower portion of the outer hose wall for guiding the hose along the guide rail, and a traction device is attached to the hose for pulling the hose into the basin as it is guided along the guide rail.

In a preferred embodiment, the horizontal guide rail section extends below the horizontal hose section. This provides a compact structure and also makes it possible to lay a plurality of ventilation hoses immediately adjacent each other at the same level.

If the available construction height is limited, it may be preferred to associate two guide rails with each hose, the guide rails being arranged at respective sides of a lower vertex of the outer wall of the associated hose.

Each guide rail may comprise a hollow profile with a slit extending in a longitudinal direction along the guide rail, and each hose holding device comprises a connector glidable along the slit and extending therethrough into the interior of the hollow profile and a slide, which may be a roller, in the interior of the hollow profile. This provides a simple structure and friction-free gliding of the hose holding devices along the guide rail. However, each guide rail may comprise a round or T-profile and each hose holding device may comprise a slide held on, and glidable along, the round or T-profile.

Each holding device preferably comprises a ring and the lower portion of the outer hose wall is bonded to the ring, for example by gluing or welding. This holds the hose in a desired manner from below. A circumferentially closed holding ring is advantageous because it is easy to manufacture and to assemble with the hose, and provides stability.

The tubular hose preferably has a closure piece attached to one end thereof and guided along the guide rail, and the traction device is attached to the closure piece at the level of the hose axis. In this way, the traction force will be exerted directly upon the hose along its axis, rather than along the guide rail. In this arrangement, the ventilation system preferably further comprises a guide element, such as a pulley, affixed to the basin adjacent the arcuate guide rail section for engaging and guiding the hose as it is pulled into the basin since the hose then tends to pull away from the arcuate guide rail section between hose holding devices. However, it is also possible to exert the traction force in alignment with the guide rail by a traction device which interconnects the hose holding devices.

To permit the hoses to be stabilized and to be laid in relative sharply curved arcuate sections without reducing their cross sections, elbow joints may be provided to connect the connecting section of the hose to the intake and horizontal hose sections, the elbow joints being guided along the guide rail. Preferably, the intake and horizontal guide rail sections are rectilinear and the elbow joints are positioned adjacent respective ends of said guide rail sections when the hose has been pulled into the basin. A stationary abutment is affixed to the basin adjacent each horizontal guide rail section end connected to the arcuate guide rail section, and a stop is attached to the elbow joint positioned thereat and engaging the abutment. This assures that the horizontal hose section between the latter elbow joint and the closure piece is taut.

Preferably, the perforated hose section is the horizontal section and the other hose sections are not perforated so that they may serve as supply sections.

In the illustrated embodiment, a plurality of guide rails and associated hoses are arranged in the basin parallel to each other. In this way, the ventilation capacity may be widely adjusted while each hose may be individually pulled into the basin or replaced while the system remains operative.

BRIEF DESCRIPTION OF THE DRAWINGS

The invention will be described in detail with reference to presently preferred embodiments shown in the drawings. wherein:

FIG. 5 shows the system of FIG. 1 at the stage when the ventilation hose is pulled in; and FIG. 6 is a sectional end view of the ventilation system along line VI—VI of FIG. 1.

DESCRIPTION OF THE PREFERRED EMBODIMENTS

Figure 1:
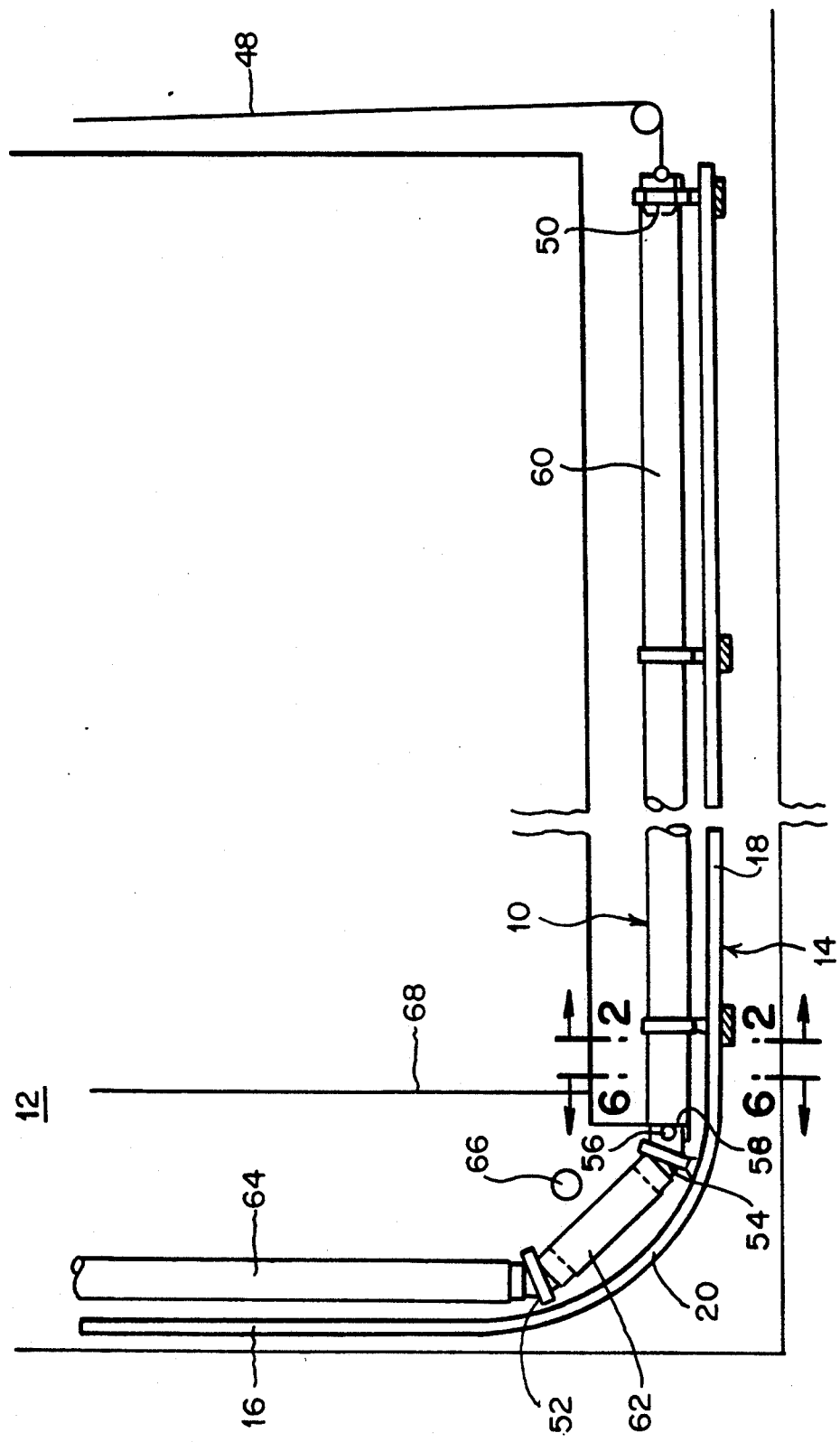
FIG. 1 is a schematic side view of a ventilation system according to the invention with several rail-guided ventilation hoses.

The ventilation system according to the invention includes several i.e. six, ventilation hoses 10 arranged parallel and, adjacent each other, in a liquid-filled basin 12, as shown in FIG. 6. Each hose 10 is associated with, and guided by a guide rail 14 which is fixedly installed in the basin 12 and which comprises a vertical intake section 16 and a longer horizontal section 18 running parallel to the bottom of the basin. Sections 16, 18, are connected to one another arcuate rail section 20.

Figure 2:
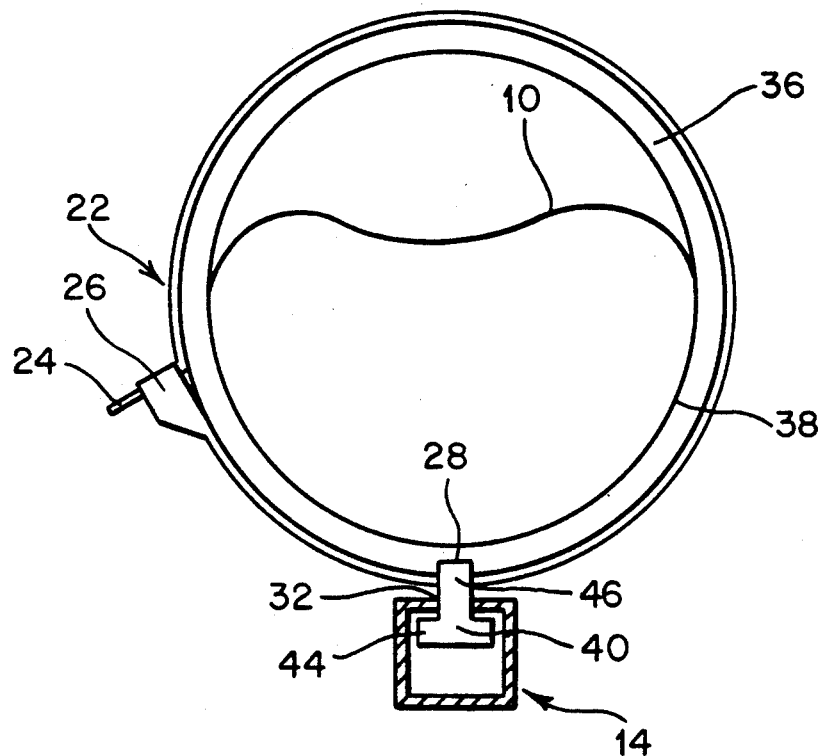
FIG. 2 is a section along line II—II of FIG. 1 showing a ventilation hose, with a holding device and an associated guide rail.

According to embodiment shown in FIG. 2, the guide rails 14 have a rectangular profile with an upper longitudinal slit 32, extending along the middle of the profile. Holding devices connected to the hose run along the guide rails 14 which comprise a ring 36 and snugly surrounds the hose 10. Hose 10 is glued or welded or permanently connected to the ring 36 in any other fashion. In the illustrated embodiment, a gluing zone 38 is illustrated running along the lower side of the ventilation hose 10 over approximately half of the ring's circumference. It is desirable that the ventilation hoses 10 are held from below in the holding devices. Halfrings arranged on the lower side of the ventilation hoses 10 would also fulfill this function although rings 36 extending over the entire circumference are preferable due to manufacture and assembling advantages as well as for reasons of stability.

At the lower vertex of each ring 36 is located a slide 40 which is attached to the ring 36 with a clip 22. The band 24 of the clip 22 is wrapped around the ring 36 and tightened by buckle 26. Ring 36 is provided with a groove 28 in which the slide 40 is located. The slide 40 has a guide body 44 loosely moveable lengthwise in guide rail 14 and connected with ring 36 by way of connecting piece 46 projecting through the longitudinal slit 32. The guide body 44 may consist of low-friction material and slides in the guide rail 14 or runs on rollers therein.

Figure 3:
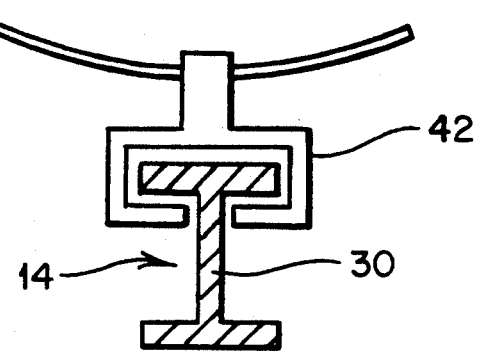
FIG. 3 and FIG. 4 show alternative designs of the guide rail.
Figure 2A:
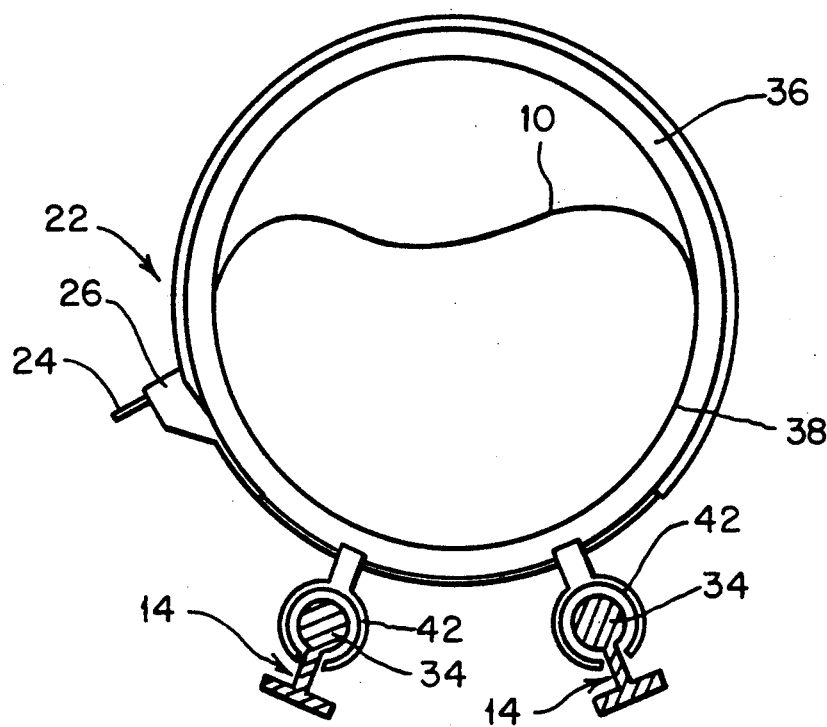
FIG. 2a is simlar to FIG. 2 and shows a modification wherein two guide rails are associated with the ventilation hose.
Figure 4:
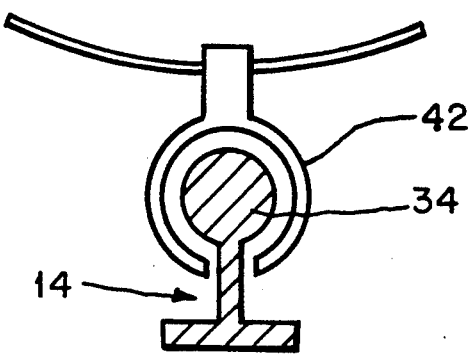

FIG. 3 and FIG. 4 show alternative designs of the guide rail 14 as T-profile 30 or round profile 34 respectively slidably supporting a slide 42 connected to the holding device and moveable lengthwise. FIG. 2a shows a modification of the embodiment of FIG. 4 wherein two guide rails 14 slidably support the hose holding devices. The two guide rails are arranged at respective sides of the lower vertex of ring 36.

The rail permits hose 10 to be pulled into the operative position shown in FIG. 1. For that purpose a traction rope 48 or other traction device is provided for each hose 10 which engages the hose end opposite the compressed air source of the hose and pulls the hose. In the illustrated embodiment, the opposite hose end is closed with an end piece 50 which forms an axial extension of the hose 10 and which is guided in a manner similar to the holding devices along the guide rail 14. The connection of the hose 10 to the end piece 50 can be accomplished with a band clip. The traction rope 48 engages a hook of the end piece 50 which is located at the level of the hose axis. The end piece 50 may also function as a stop and be provided with devices for the deaeration and drainage of the hose 10.

Each hose 10 comprises a vertically extending intake section 64, an intermediate section 62 and a horizontal section 60 and two pieces 52, 54 interconnect the hose sections. They are 135 degree elbow joints which come to rest in the operative position of the ventilation hose 10 in the vicinity of the arcuate section 20 of the guide rail 14. Both pieces 52, 54 are guided in a manner similar to the holding devices on the guide rail 14. The upper piece 52 comes to rest at the junction of the arcuate section 20 and the intake section 16 and the lower piece 54 at the junction of the horizontal section 18 of the guide rail 14.

As shown in FIG. 6, the lower pieces 54 carry cross bars 56 which serve as stops and act as fixed points with vertical supports 58 which are fixedly arranged in the basin 12 in order to hold the pieces 54 against the prevailing traction force. Thus, when the operative position is reached, the hose section 60 lying between the lower piece 54 and the end piece 50 is tensioned. Only this section of the hose 60 which runs parallel to the horizontal section 18 of the guide rail 14 is perforated to operate as a ventilation hose. The hose section 62 and the hose section 64 not perforated and operates as supply hoses which lead to a compressed air source.

The distance between the holding devices on the hose is determined by the requirement that the air-filled ventilation hose section 60 may be subjected only to a limited deformation due to the buoyancy between neighboring support points. In the interest of saving material and reducing manufacturing costs one attempts to keep the number of holding devices down. On the other hand, in the vicinity of the arcuate guide rail section 20, a relatively sharp curving of the hose is desirable to save space. Is the distance between the holding devices relatively large, the hose 10 has the tendency to pull away from the guide rail 14 in section 20. For this reason, the invention provides for each hose at the mid-point between intake section 16 and horizontal section 18 of the guide rail 14 a roller 66 fixedly arranged in basin 12 whose axis extends parallel to the axis of curvature of arcuate section 20. As illustrated in FIG. 5, when the hose 10 is pulled into the basin, it comes in contact with the roller 66, which freely rotates and holds the hose so close to guide rail 14 that the hose extends below basin inserts 68 while a constant and sufficient component of tractive force acts in the direction of intake section 16 of guide rail 14. In the operative position shown in FIG. 1, pieces 52, 54 hold the hose section 62 at a distance from the roller 66 and so that its cross-section is not constructed.

The anchoring of the hose along the horizontal ventilation hose section 60 onto the guide rail 14 with a holding device engaging the lower side of the hose allows the hose to be laid in the basin 12 without prestress. The tractive force exerted upon end piece 50 only has to overcome the resistance to the sliding movement along the rail when hose 10 is pulled into the basin. As soon as the lower piece 54 has reached its stop position, only a holding force is required to compensate for the tensile force caused by the buoyancy of the hose. This holding force is essentially lower for hoses held from below than the prestress necessary for hoses supported from above since the holding and guiding arrangement for the hose can absorb much higher forces without resulting in a cross-sectional narrowing of the hose.

What we claim is:

1. A ventilation system for a liquid-filled basin having a bottom, which comprises
    (a) at least one guide rail affixed to the basin, each guide rail having
        (1) a descending intake section,
        (2) a horizontal section adjacent the bottom of the basin and
        (3) an arcuate section connecting the intake and horizontal sections of the guide rail,
    (b) a hose moveable along each guide rail, each hose having a circumferentially extending outer wall and
        (1) an intake section associated with the descending intake section of the guide rail,
        (2) a horizontal section associated with the horizontal guide rail section and
        (3) a connecting section associated with the arcuate guide rail section,
        (4) at least one of the hose sections being perforated for permitting air to escape from the hose into the liquid-filled basin,
    (c) a plurality of hose holding devices glidably guided along the guide rail and spaced therealong from each other for retaining the hose in position along the guide rail against buoyancy in an operating position of the hose in the liquid-filled basin,
        (1) the holding devices being connected to a lower portion of the outer hose wall for guiding the hose along the guide rail, and
    (d) a traction device attached to the hose for pulling the hose into the basin as it is guided along the guide rail.

2. The ventilation system of claim 1, wherein the horizontal guide rail section extends below the horizontal hose section.

3. The ventilation system of claim 1, comprising two of said guide rails associated with each hose, the guide rails being arranged at respective sides of a lower vertex of the outer wall of the associated hose.

4. The ventilation system of claim 1, wherein each guide rail comprises a hollow profile with a slit extending in a longitudinal direction along the guide rail, and each hose holding device comprises a connector glidable along the slit and extending therethrough into the interior of the hollow profile and a slide in the interior of the hollow profile.

5. The ventilation system of claim 1, wherein each guide rail comprises a T-profile and each hose holding device comprises a slide held on, and glidable along, the T-profile.

6. The ventilation system of claim 1, wherein each guide rail comprises a round profile and each hose holding device comprises a slide held on, and glidable along, the round profile.

7. The ventilation system of claim 1, wherein each holding device comprises a ring and the lower portion of the outer hose wall is bonded to the ring.

8. The ventilation system of claim 1, wherein the hose is tubular and has an axis, a closure piece is attached to one end of the tubular hose and is guided along the guide rail, and the traction device is attached to the closure piece at the level of the hose axis.

9. The ventilation system of claim 1, further comprising a guide element affixed to the basin adjacent the arcuate guide rail section for engaging and guiding the hose as it is pulled into the basin.

10. The ventilation system of claim 9, wherein the guide element is a pulley.

11. The ventilation system of claim 1, further comprising elbow joints connecting the connecting section of the hose to the intake and horizontal hose sections, the elbow joints being guided along the guide rail.

12. The ventilation system of claim 11, wherein the intake and horizontal guide rail sections are rectilinear and the elbow joints are positioned adjacent respective ends of said guide rail sections when the hose has been pulled into the basin.

13. The ventilation system of claim 12, further comprising a stationary abutment affixed to the basin adjacent each horizontal guide rail section end connected to the arcuate guide rail section, and a stop attached to the elbow joint positioned thereat and engaging the abutment.

14. The ventilation system of claim 1, wherein the perforated hose section is the horizontal section and the other hose sections are not perforated.

15. The ventilation system of claim 1, comprising a plurality of said guide rails and associated hoses arranged in the basin parallel to each other.

* * * * *